Patented May 2, 1950

2,505,817

UNITED STATES PATENT OFFICE 2,505,817

HYDROGENATED POLYALKYLATED PHENOLS

Arthur C. Whitaker, Oakmont, Pa., and William W. Weinrich, Bartlesville, Okla., assignors to Gulf Research & Development Company, Pittsburgh, Pa., a corporation of Delaware No Drawing. Application May 28, 1945, Serial No. 596,417

4 Claims. (Cl. 260—586)

The present invention relates to the production of new compounds and more particularly it relates to the production of hydrogenated polyalkylated phenols, namely the enol and keto forms of 2,6-di-tertiary-butyl-4-methyl phenol plus 4 atoms of combined hydrogen, and 2,6-di-tertiary-butyl-4-methyl phenol plus 2 atoms of combined hydrogen, and to processes of producing these compounds.

The primary object of the present invention is to provide, as new compounds the enol and keto forms of hydrogenated polyalkylated phenols comprising 2,6-di-tertiary-butyl-4-methyl phenol plus 4 atoms of combined hydrogen, and 2,6-di-tertiary-butyl-4-methyl phenol plus 2 atoms of combined hydrogen.

Another object of the present invention is to provide, as new compounds the enol and keto forms of hydrogenation products of 2,6-di-tertiary-butyl-4-methyl phenol which are adapted to be utilized as chemical intermediates in the manufacture of plasticizers, pharmaceuticals, detergents, and antioxidants.

These objects are attained in accordance with the present invention, whereby 2,6-di-tertiary-butyl-4-methyl phenol may be catalytically hydrogenated to convert it into either 2,6-di-tertiary-butyl-4-methyl phenol plus 4 atoms of combined hydrogen or into 2,6-di-tertiary-butyl-4-methyl phenol plus 2 atoms of combined hydrogen; and that if the phenol is subjected to a slightly higher initial pressure and a slightly higher hydrogen pressure during hydrogenation for a slightly longer length of time than would be required for the production of the product having only 2 atoms of combined hydrogen, it may be combined with 4 atoms of hydrogen; and that the products may be produced as a mixture of the enol and keto form of the compounds.

In general, in practicing our invention for the production of either 2,6-di-tertiary-butyl-4-methyl phenol plus 4 atoms of combined hydrogen or 2,6-di-tertiary-butyl-4-methyl phenol plus 2 atoms of combined hydrogen, we introduce the phenol in suitable amount, and about 8 to 11 per cent, by weight, of a suitable hydrogenation catalyst, such as Raney or other form of nickel, platinum, or palladium, into a suitable pressure-resistant vessel, such as a rocking bomb, which is then closed and charged with hydrogen to the desired pressure; for example, about 1300 pounds per square inch of hydrogen. Heat is then applied to the bomb, for example, electrically, and the bomb is brought up to an initial reaction temperature of about 180° C. and to an initial reaction pressure of, for example, about 2300 pounds per square inch. About two hours may be required to heat the bomb and its contents to the initial reaction temperatures and pressures specified.

The temperature of reaction range is from 160° to 250° C. and the pressure range from 1600 to 2500 pounds per square inch.

The bomb is continuously heated and its contents agitated, after the initial reaction temperature and pressure have been obtained, for a period varying for example from about one hour to three hours, the latter time being required for the production of the 2,6-di-tertiary-butyl-4-methyl phenol plus 4 atoms of combined hydrogen, while the former time specified may be required for the completion of the reaction in which the 2,6-di-tertiary-butyl-4-methyl phenol plus 2 atoms of combined hydrogen is produced.

At the completion of the reaction as indicated by a drop in the pressure (calculated on the basis of temperature—it may actually be a rise in pressure) of the bomb corresponding to the absorption of either one or two moles of hydrogen per mole of 2,6-di-tertiary-butyl-4-methyl phenol, the bomb is preferably allowed to cool and its contents are removed and filtered to separate the catalyst from the hydrogenation products. The hydrogenation products may then be purified in any desired manner to separate them from the initial starting materials, such as by fractionation in the case of liquid products, while the solid products may be purified by rectification, sublimation, or recrystallization.

It will be understood that the degree of hydrogenation is not destructive, i. e. the hydrogenation is not carried on to the extent that the OH group is reduced to give a hydrocarbon nor are the rings opened nor any groups removed.

It will be further understood that the temperature necessary to carry on a relatively mild hydrogenation is dependent upon the pressure and the higher the operating pressure the lower the temperature required to effect hydrogenation. The initial pressure is not as important as the pressure on the material when heated or the pressure at the end of the reaction. There must be sufficient hydrogen present at the end of the reaction to insure completion of the degree of hydrogenation desired, the final excess of hydrogen being indicated by the pressure of hydrogen present at that stage.

The following specific examples will serve to illustrate and explain our invention:

Example 1

This example relates to the preparation of 2,6-di-tertiary-butyl-4-methyl phenol plus 4 atoms of combined hydrogen from 2,6-di-tertiary-butyl-4-methyl phenol. 60 parts of 2,6-di-tertiary-butyl-4-methyl phenol, 9 parts of Raney nickel catalyst, and 1620 pounds per square inch of hydrogen were charged to a rocking bomb. The bomb was electrically heated for a period of about two hours until a reaction temperature of about 180° C. and a pressure of about 2350 pounds per square inch of hydrogen were obtained. The reaction was completed after the heating had been continued for a further period of about two and one-half hours and when a final reaction temperature of about 240° C. and a final pressure of about 2470 pounds per square inch had been attained. The product, after rectification, had the following properties:

|            | B. P.         | Per cent C | Per cent H | Sp. Gr. 60/60 | $n_D^{20}$ |
|------------|---------------|------------|------------|---------------|------------|
| Calculated |               | 80.36      | 12.50      |               |            |
| Found      | 132–4° C./20 mm | 80.39    | 12.50      | 0.8883        | 1.4598     |

In the above example "Sp.Gr. 60/60" refers to the specific gravity of the compound at 60° F. as compared to water at 60° F. and $n_D^{20}$ refers to the refractive index at 20° C., using the D line of sodium as the source of light.

The following equation illustrates the products produced in the above example, the structural formula given on the left representing the enol form of the compound while the formula on the right represents the keto form of the compound, both forms occurring in admixture:

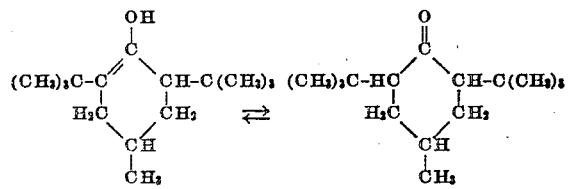

2,6-di-tertiary-butyl-4-methyl-1-cyclohexenol⇌2,6-di-tertiary-butyl-4-methyl cyclohexanone.

Example 2

This example relates to the preparation of 2,6-di-tertiary-butyl-4-methyl phenol plus 2 atoms of combined hydrogen from 2,6-di-tertiary-butyl-4-methyl phenol. 80 parts of 2,6-di-tertiary-butyl-4-methyl phenol, 8 parts of Raney nickel catalyst, and 1260 pounds per square inch of hydrogen were charged to a rocking bomb. The bomb was electrically heated for a period of about two and one-half hours until a reaction temperature of about 200° C. and a pressure of about 2000 pounds per square inch were attained. The reaction was completed after the heating had been continued for a further period of about forty-five minutes and when there had been a pressure drop corresponding to the addition of one mole of hydrogen. At this point the temperature was 215° C. and the pressure was 1900 pounds per square inch. After cooling the bomb the contents thereof were discharged and filtered, and the hydrogenation product thus obtained, after recrystallization, had the following properties:

|            | M. P. | Percent C | Percent H |
|------------|-------|-----------|-----------|
|            | °C.   |           |           |
| Found      | 40    | 80.73     | 11.78     |
| Calculated |       | 81.08     | 11.71     |

The following equation illustrates the products produced in the above example, the structural formula given on the left representing the enol form of the compound while the formula on the right represents the keto form of the compound, both forms occurring in admixture:

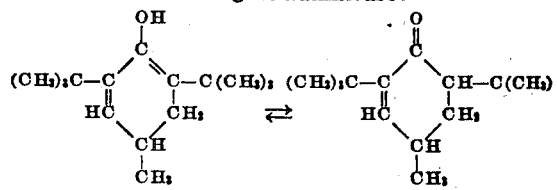

2,6-di-tertiary-butyl-4-methyl-1,5-cyclohexadiene-1-ol⇌2,6-di-tertiary-butyl-4-methyl-2-cyclohexene-1-one.

The compounds of the present invention are adapted to be employed as chemical intermediates in the manufacture of pharmaceuticals, plasticizers, detergents, and as antioxidants for mineral oils and gasoline.

Thus we have described the new and useful compounds herein specifically described and process for preparing them.

The process of hydrogenating 2,6-di-tertiary-butyl-4-methyl phenol to combine 4 atoms of hydrogen therewith and the compounds obtained thereby are disclosed and claimed in our copending divisional application, Serial No. 78,225, filed February 24, 1949.

What we claim is:

1. An equilibrium mixture of enol and keto form of compounds having the following structural formulas:

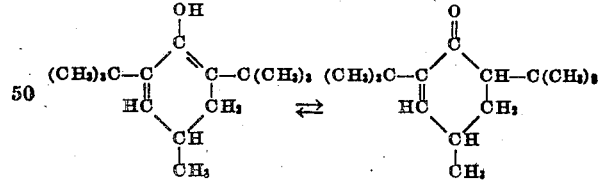

2. As a new product, a compound having the following structural formula:

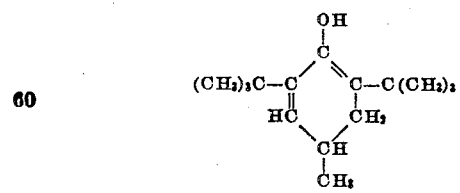

3. As a new product, a compound having the following structural formula:

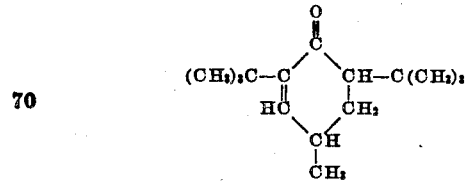

4. A method of converting 2,6-di-tertiary-butyl-4-methyl phenol into 2,6-di-tertiary-butyl- 4-methyl phenol plus 2 atoms of hydrogen which comprises subjecting 2,6 - di - tertiary - butyl - 4-methyl phenol to an initial hydrogen pressure of about 1300 pounds per square inch, and in the presence of a catalyst heating and agitating the reactants until a reaction temperature of about 200° C. and a pressure of about 2000 pounds per square inch are obtained and continuing said heating until said reaction is completed at a temperature of about 215° C. and at a pressure of about 1900 pounds per square inch.

ARTHUR C. WHITAKER.
WILLIAM W. WEINRICH.

REFERENCES CITED

The following references are of record in the file of this patent:

UNITED STATES PATENTS

| Number | Name | Date |
| --- | --- | --- |
| 1,829,869 | Lazier | Nov. 3, 1931 |
| 2,087,691 | Lazier | July 20, 1937 |
| 2,265,582 | Stevens et al. | Dec. 9, 1941 |

FOREIGN PATENTS

| Number | Country | Date |
| --- | --- | --- |
| 455,820 | Great Britain | Oct. 28, 1936 |

OTHER REFERENCES

Beilstein, "Handbuch der Organischen Chemie," vol. VI, Supplement page 32, vol. VII supplement page 40.

Ellis, "Hydrogenation of Organic Substances," 3rd edition, pages 231, 233. Published 1930 by D. Van Nostrand Co., New York.